United States Patent
Sugaya

(10) Patent No.: US 9,959,483 B2
(45) Date of Patent: May 1, 2018

(54) SYSTEM AND METHOD FOR INFORMATION IDENTIFICATION

(71) Applicant: OPTiM Corporation, Saga (JP)

(72) Inventor: Shunji Sugaya, Tokyo (JP)

(73) Assignee: OPTIM CORPORATION, Tokyo (JP)

( * ) Notice: Subject to any disclaimer, the term of this patent is extended or adjusted under 35 U.S.C. 154(b) by 77 days.

(21) Appl. No.: 15/138,324

(22) Filed: Apr. 26, 2016

(65) Prior Publication Data
US 2017/0161585 A1    Jun. 8, 2017

(30) Foreign Application Priority Data
Dec. 2, 2015 (JP) .................... 2015-236132

(51) Int. Cl.
G06K 9/00 (2006.01)
G06K 9/62 (2006.01)
G06T 7/00 (2017.01)
G06K 9/46 (2006.01)

(52) U.S. Cl.
CPC ....... G06K 9/6201 (2013.01); G06K 9/00577 (2013.01); G06K 9/46 (2013.01); G06T 7/0028 (2013.01); G06T 2207/10004 (2013.01)

(58) Field of Classification Search
CPC .... G06K 9/00577; G06K 9/6201; G06K 9/46; G06K 9/00221; G06T 7/0028
USPC ........................................................ 382/103
See application file for complete search history.

(56) References Cited

U.S. PATENT DOCUMENTS

| | | | |
|---|---|---|---|
| 2003/0007688 A1* | 1/2003 | Ono | G06K 9/00221 382/167 |
| 2005/0089197 A1* | 4/2005 | Iwasaki | G06K 9/00221 382/115 |
| 2011/0194732 A1* | 8/2011 | Tsuji | G06K 9/00288 382/103 |
| 2015/0043828 A1* | 2/2015 | Valente | G06K 9/46 382/201 |
| 2016/0078284 A1* | 3/2016 | Sato | G06F 17/30259 382/118 |

FOREIGN PATENT DOCUMENTS

JP      2013-222335      10/2013

* cited by examiner

*Primary Examiner* — Van D Huynh
(74) *Attorney, Agent, or Firm* — Lex IP Meister, PLLC

(57) ABSTRACT

The present invention is to provide a system and a method for information identification to more accurately identify an object and make the process more easily. The system for information identification includes a database that registers information on an object; images the object from a predetermined direction by using the first imaging unit; images the object from a different direction by the second imaging unit; registers information on the object imaged by the first imaging unit in the database; and compares information on the object imaged by the second imaging unit with information registered in the database to identify the object.

3 Claims, 15 Drawing Sheets

Fig. 4
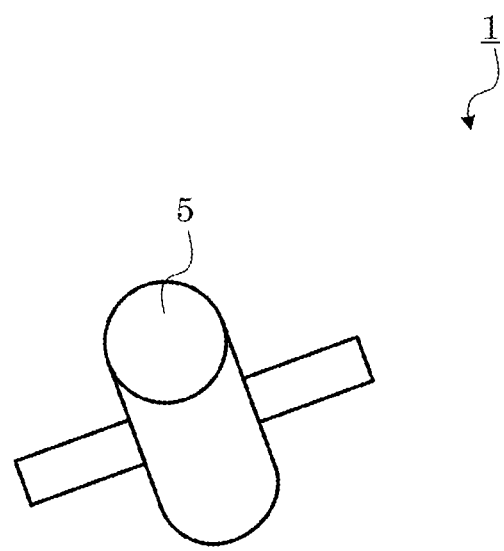
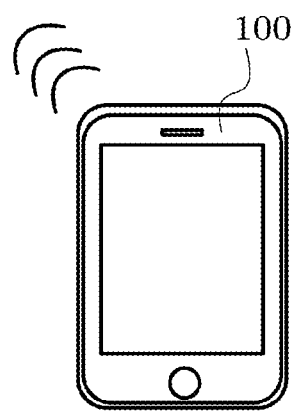

Fig. 14

OBJECT INFORMATION DATABASE

| IMAGE INFORMATION | LOCATION INFORMATION | DIRECTION INFORMATION | TEXT INFORMATION |
|---|---|---|---|
| Image A | X0,Y0 | Northwest | Securities Company XX |
| Image B | X1,Y1 | North | Securities Company XX |
| Image C | X2,Y2 | West-northwest | Tree of Securities Company XX |

SYSTEM AND METHOD FOR INFORMATION IDENTIFICATION

CROSS REFERENCE TO RELATED APPLICATIONS

This application claims priority to Japanese Patent Application No. 2015-236132 filed on Dec. 2, 2015, the entire contents of which are incorporated by reference herein.

TECHNICAL FIELD

The present invention relates to a system and a method for information identification to identify an object contained in image data.

BACKGROUND ART

Recently, the systems to identify an imaged object have been widespread. In such systems, terminals with an imaging and a measurement functions image an object and identify the imaged object.

For example, Patent Document 1 discloses the constitution that stores location information on a plurality of objects and identifies an object based on information on the taken images, the imaging points, and the imaging directions.

CITATION LIST

Patent Literature

Patent Document 1: JP 2013-222335 A

SUMMARY OF INVENTION

However, after identifying a first object candidate based on information on the taken images, the imaging points, and the imaging directions, the constitution of Patent Document 1 identifies a second object candidate based on the distance from the imaging point to the object. As a result, the distance to the imaging point may be changed even if the same object is imaged. This may cause a wrong object to be identified or may complicate the process of identifying an object twice or more times.

Therefore, the present invention focuses on the solution that registers information on an object in a database and compares this information registered in this database with the taken image data to more accurately identify the object and to make the process more easily.

The objective of the present invention is to provide a system and a method for information identification to more accurately identify an object and make the process more easily.

The first aspect of the present invention provides a system for information identification, including:
a database that registers information on an object;
a first imaging unit that images the object from a predetermined direction;
a second imaging unit that images the object from a different direction;
a registration unit that registers information on the object imaged by the first imaging unit in the database; and
an identification unit that compares information on the object imaged by the second imaging unit with information registered in the database to identify the object.

According to the first aspect of the present invention, a system for information identification includes a database that registers information on an object; images the object from a predetermined direction; images the object from a different direction; registers information on the object imaged by the first imaging unit in the database; and compares information on the object imaged by the second imaging unit with information registered in the database to identify the object.

The first aspect of the present invention falls into the category of a system for information identification, but the category of a method for information identification has the same functions and effects.

The second aspect of the present invention provides the system according to the first aspect of the present invention further includes an analysis unit that analyzes images of the object imaged two or more times by the first imaging unit, in which the registration unit registers analytical information on the object whose images have analyzed in the database, and an identification unit that compares information on the object imaged by the second imaging unit with analytical information registered in the database to identify the object.

According to the second aspect of the present invention, the system according to the first aspect of the present invention further analyzes images of the object imaged two or more times by the first imaging unit, registers analytical information on the object whose images have analyzed in the database, and compares information on the object imaged by the second imaging unit with analytical information registered in the database to identify the object.

The third aspect of the present invention provides a system for information identification, including:
a first imaging unit that images an object from a predetermined direction;
a second imaging unit that images the object from a different direction;
a first extraction unit that extracts the feature amount of a first image imaged by the first imaging unit;
a second extraction unit that extracts the feature amount of a second image imaged by the second imaging unit; and
an identification unit that compares the feature amount extracted by the first extraction unit with the feature amount extracted by the second extraction unit to identify the object.

According to the third aspect of the present invention, a system for information identification images an object from a predetermined direction; images an image of the object from a different direction; extracts the feature amount of a first image imaged by the first imaging unit; extracts the feature amount of a second image imaged by the second imaging unit; and compares the feature amount extracted by the first extraction unit with the feature amount extracted by the second extraction unit to identify the object.

The third aspect of the present invention falls into the category of a system for information identification, but the category of a method for information identification has the same functions and effects.

The fourth aspect of the present invention provides a method for information identification, the method being executed by a system for information identification, including:
a step of registering information on an object;
a first step of imaging the object from a predetermined direction;
a second step of imaging the object from a different direction;
a step of registering information on the object imaged in the first step in the database; and a step of comparing information on the object imaged in the second step with information registered in the database to identify the object.

The fifth aspect of the present invention provides a method for information identification, the method being executed by a system for information identification, including:

a step of imaging an object from a predetermined direction;

a step of imaging the object from a different direction;

a first step of extracting the feature amount of a first image imaged from a predetermined direction;

a second step of extracting the feature amount of a second image imaged from a different direction; and a step of comparing the feature amount extracted in the first step with the feature amount extracted in the second step to identify the object.

The present invention can provide a system and a method for information identification to more accurately identify an object and make the process more easily.

BRIEF DESCRIPTION OF DRAWINGS

FIG. 4 shows an overall configuration diagram of the system for information identification 1 according to the second embodiment.

FIG. 14 shows an object information database.

DESCRIPTION OF EMBODIMENTS

Embodiments of the present invention will be described below with reference to the attached drawings. However, this is illustrative only, and the scope of the present invention is not limited thereto.

System for Information Identification 1 According to First Embodiment

Figure 1:
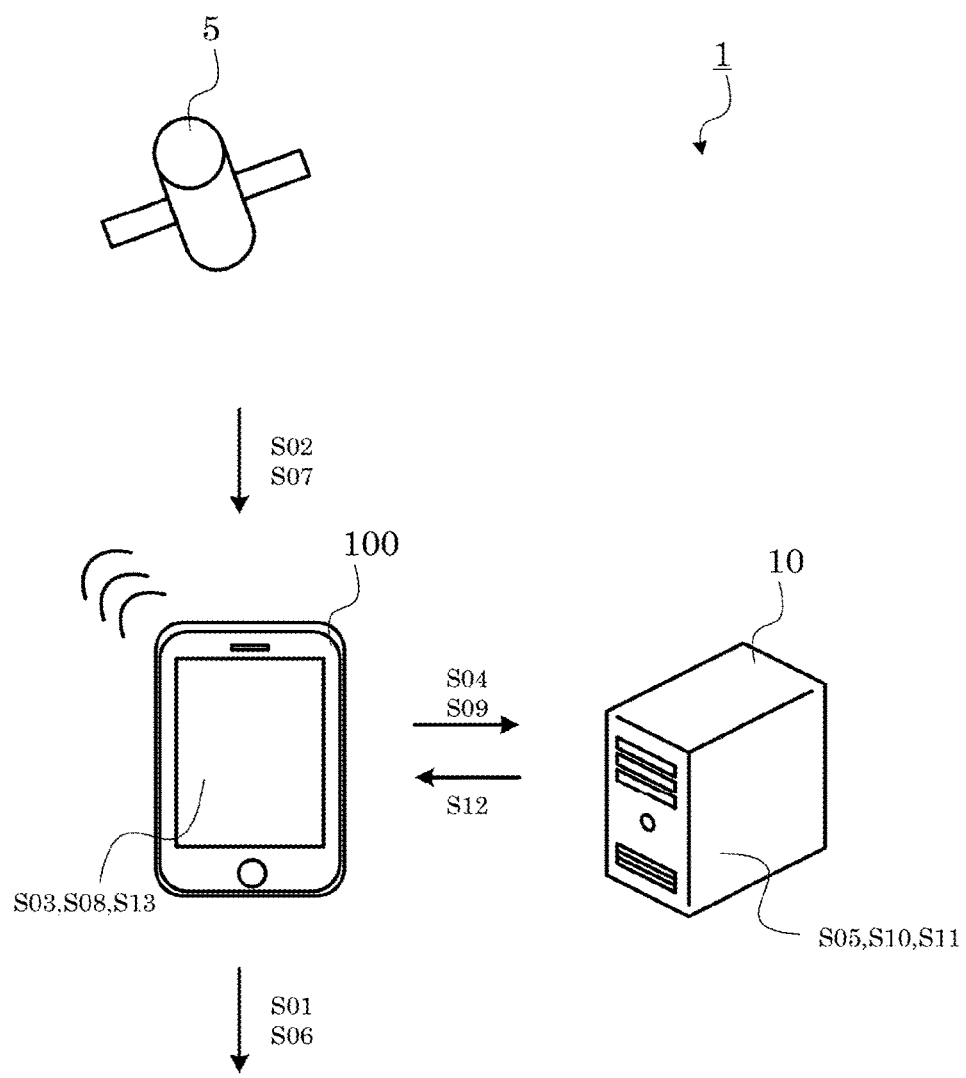
FIG. 1 shows a schematic diagram of the system for information identification 1 according to the first embodiment.

The first embodiment of the present invention will be described below with reference to FIG. 1. FIG. 1 shows an overview of the system for information identification 1 according to a preferable first embodiment of the present invention. The system for information identification 1 includes an information identification server 10, a mobile terminal 100, and a GPS 5. The respective numbers of the mobile terminal 100 and the information identification server 10 is not limited to one and may be two or more. The processes to be described later may be performed by either the mobile terminal 100 or the information identification server 10, or the both.

The information identification server 10 is a server device with a data communication function, etc.

The mobile terminal 100 is a wearable terminal or an electrical appliance with a data communication function, etc. Examples of the mobile terminal 100 include and electrical appliances such as a wearable terminal such as a glasses type terminal, and a head mounted display, a mobile phone, a mobile terminal, a personal computer, a net book terminal, a slate terminal, an electronic book terminal, and a portable music player. The mobile terminal 100 may be an uninhabited airborne vehicle with an imaging function, a data communication function, etc.

First, the mobile terminal 100 images an object from a predetermined direction (step S01). The predetermined direction means the direction of one imaging point at which the mobile terminal 100 images an object. The mobile terminal 100 may image an object from a predetermined direction twice or more times. Instead of the mobile terminal 100, other devices with the functions to be described later may image an object.

The mobile terminal 100 acquires an imaging point at which the mobile terminal 100 has imaged an object as its own location information (step S02). In the step S02, the mobile terminal 100 acquires its own location information from a GPS 5. The location information is on the location at which the mobile terminal exists.

The mobile terminal 100 acquires a direction from which the object has been imaged as its own direction information (step S03). In the step S03, the mobile terminal 100 acquires its own direction information from an electronic compass, etc. The direction information is on the direction from the mobile terminal 100 to the object.

The mobile terminal 100 transmits object information including the image data, image information containing the identifier, the location information, the direction information, and the text information on the name, the attribute, etc., of the object to the information identification server 10 (step S04).

The information identification server 10 receives object information. The information identification server 10 generates and registers an object information database based on the object information (step S05). In the step S05, the information identification server 10 generates an object information database associating the image information, the location information, the direction information, and the text information included in the object information.

Then, the mobile terminal 100 images an object from a predetermined direction or a different direction (step S06). The different direction means an imaging point different from that at which the mobile terminal 100 images the object in the step S01.

The mobile terminal 100 acquires its own location information in the same way as the process of the step S02 (step S07).

The mobile terminal 100 acquires its own direction information in the same way as the process of the step S03 (step S08).

The mobile terminal 100 transmits identification information containing the image information, the location information, and the direction information to the information identification server 10 (step S09).

The information identification server 10 receives the identification information. The information identification server 10 compares the location information and the direction information contained in the received identification information with those registered in the object information database to identify the image information (step S10). In the step S10, the information identification server 10 collates the image information associated with the location information and the direction information that have been received this time to identify a plurality of pieces of image information associated with the location information and the direction information as object candidates. The information identification server 10 identifies a plurality of pieces of image information associated with the location information and the direction information which are approximate to the location information and the direction information that have received this time, respectively, as object candidates. Alternatively, the information identification server 10 may identify a plurality of pieces of image information associated with the location information or the direction information which are approximate to the location information or the direction information that have received this time, respectively, as object candidates.

The information identification server 10 recognizes the plurality of pieces of identified image information to identify one piece of image information (step S11). For example, the information identification server 10 recognizes the images based on the color, the shape, and the three-dimensional modeling to identify one piece of image information.

The information identification server 10 acquires text information associated with the one piece of the identified image information and transmits the acquired text information to the mobile terminal 100 (step S12).

The mobile terminal 100 receives the text information from the information identification server 10 and displays the received text information (step S13). The above-mentioned steps may be performed by either the mobile terminal 100 or the information identification server 10, or the both.

Figure 3:
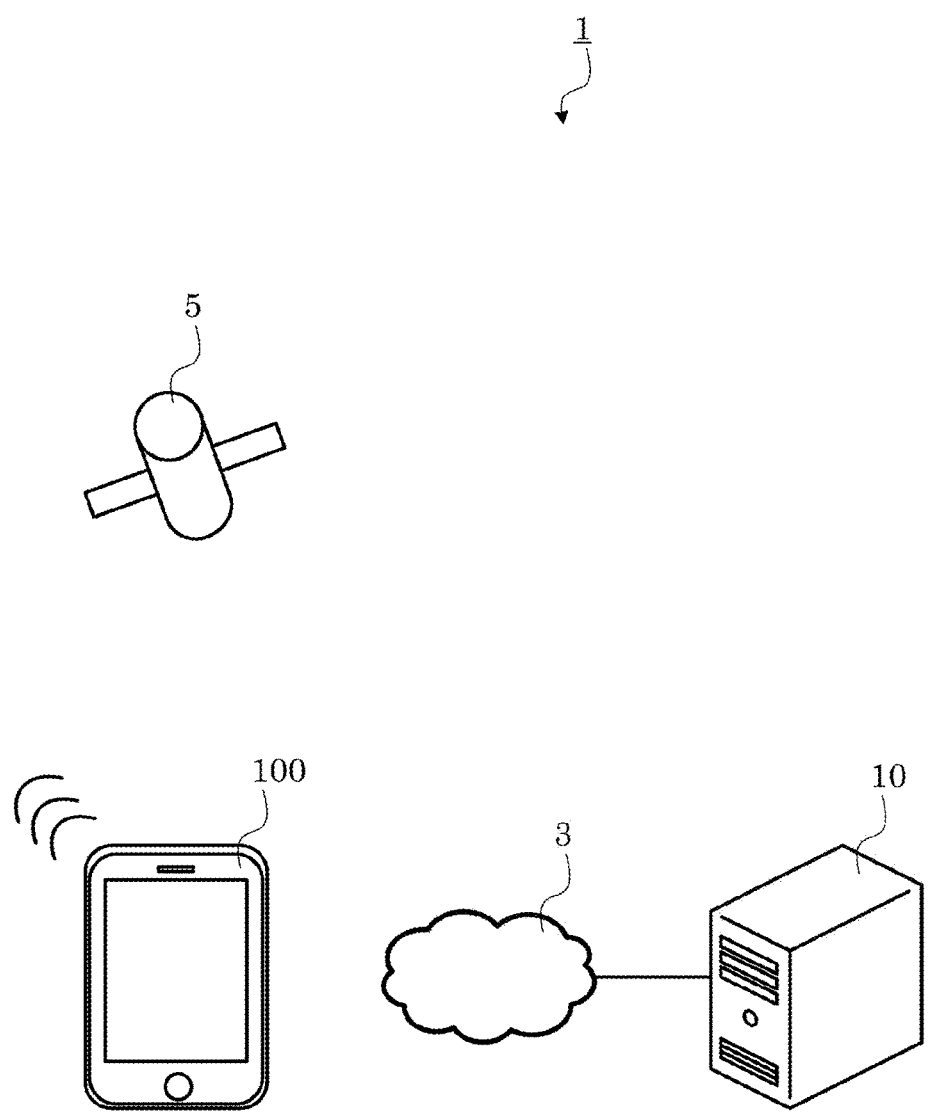
FIG. 3 shows an overall configuration diagram of the system for information identification 1 according to the first embodiment.

System Configuration of System for Information Identification 1 According to First Embodiment The system configuration of the system for information identification 1 according to the first embodiment will be described with reference to FIG. 3. FIG. 3 shows the system configuration of the system for information identification 1 according to a preferable first embodiment of the present invention. The system for information identification 1 includes an information identification server 10, a mobile terminal 100, a public line network 3 (e.g. the Internet network, a third and a fourth generation networks), and a GPS 5.

The information identification server 10 is the above-mentioned server device with the functions to be described later.

The mobile terminal 100 is the above-mentioned wearable terminal or an electric appliance with the functions to be described later. The mobile terminal 100 may be an uninhabited airborne vehicle with the functions to be described later.

The GPS 5 is a general one.

Functions of First Embodiment

Figure 5:
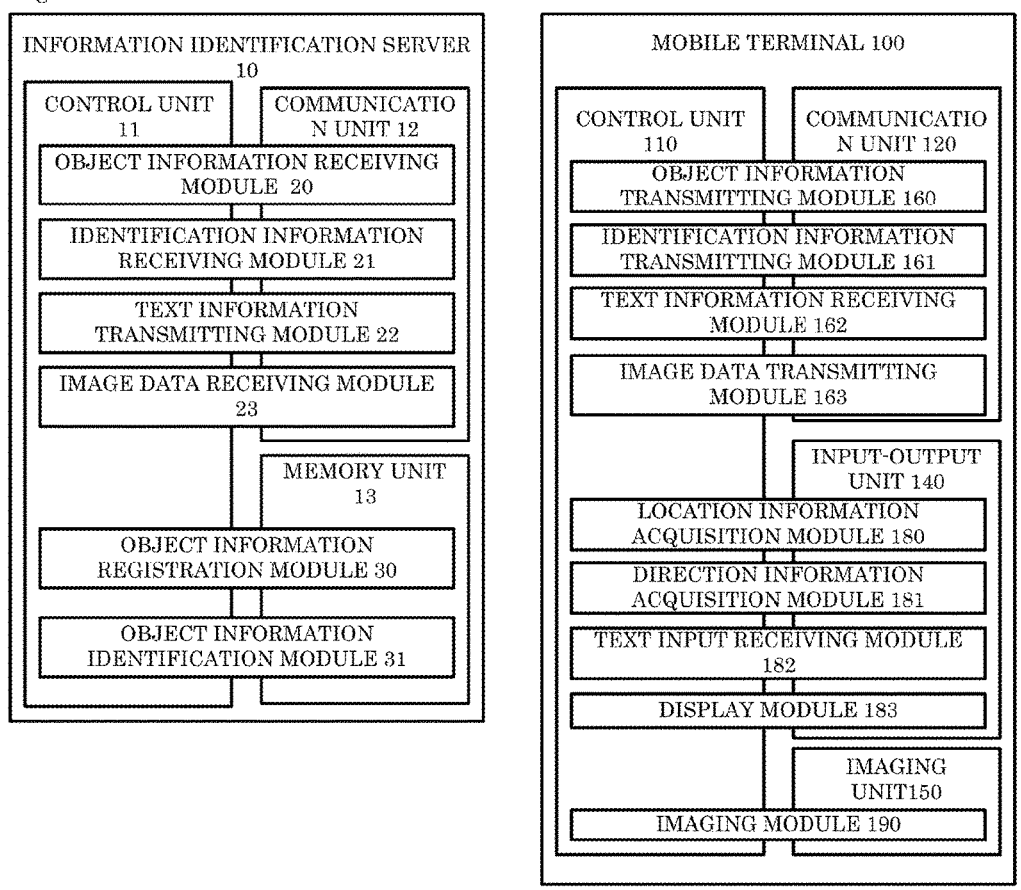
FIG. 5 shows a functional block diagram of the information identification server 10 and the mobile terminal 100 in the first embodiment.

The configuration of the devices in the first embodiment will be described with reference to FIG. 5. FIG. 5 shows a functional block diagram of the information identification server 10 and the mobile terminal 100 in a preferable first embodiment of the present invention.

The information identification server 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device capable of communicating with other devices, for example, a Wireless Fidelity or Wi-Fi® enabled device complying with IEEE 802.11.

The information identification server 10 also includes a memory unit 13 such as a hard disk, a semiconductor memory, a record medium, or a memory card to store data. The memory unit 13 has the object information database to be described later.

In the information identification server 10, the control unit 11 reads a predetermined program to run an object information receiving module 20, an identification information receiving module 21, a text information transmitting module 22, and an image data receiving module 23 in cooperation with the communication unit 12. Furthermore, in the information identification server 10, the control unit 11 reads a predetermined program to run an object information registration module 30 and an object information identification module 31 in cooperation with the memory unit 13.

The mobile terminal 100 includes a control unit 110 including a CPU, a RAM, and a ROM; and a communication unit 120 such as a device capable of communicating with other devices, for example, a Wireless Fidelity or Wi-Fi® enabled device complying with IEEE 802.11 in the same way as the information identification server 10.

The mobile terminal 100 also includes an input-output unit 140 including a display unit outputting and displaying data and images that have been processed by the control unit 110; and an input unit such as a touch panel, a keyboard, or a mouse that receives an input from a user. The mobile terminal 100 also includes a device capable of acquiring its own location information from a GPS. The mobile terminal 100 also includes a device capable of acquiring its own direction information from a geomagnetic sensor, etc. The mobile terminal 100 also includes an imaging unit 150 such as an imaging device taking still and moving images, etc., and a lens.

In the mobile terminal 100, the control unit 110 reads a predetermined program to run an object information transmitting module 160, an identification information transmitting module 161, a text information receiving module 162, and an image data transmitting module 163 in cooperation with the communication unit 120. Furthermore, in the mobile terminal 100, the control unit 110 reads a predetermined program to run a location information acquisition module 180, a direction information acquisition module 181, a text input receiving module 182, and a display module 183 in cooperation with the input-output unit 140. Still furthermore, in the mobile terminal 100, the control unit 110 reads a predetermined program to run an imaging module 190 in cooperation with the imaging unit 150.

Object Information Database Registration Process in First Embodiment

Figure 7:
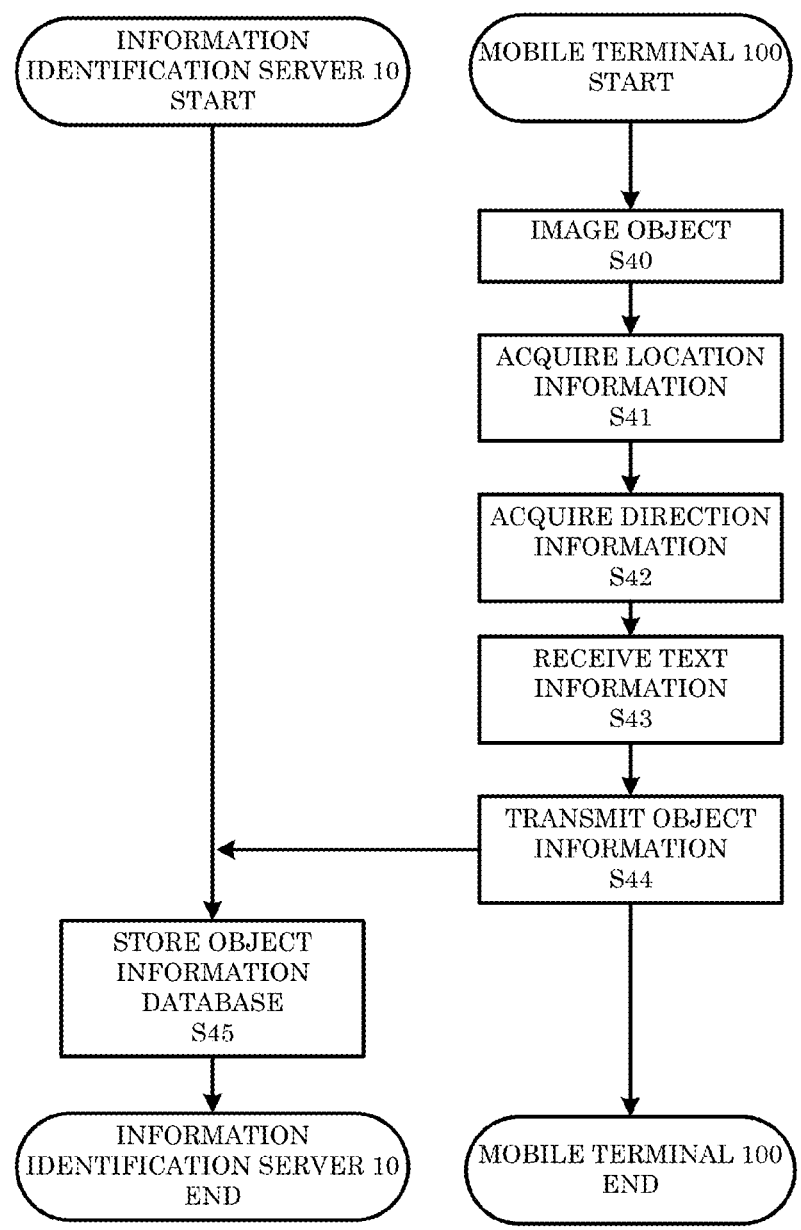
FIG. 7 shows a flow chart of the object information database registration process performed by the information identification server 10 and the mobile terminal 100 in the first embodiment.

The object information database registration process performed by the information identification server 10 and the mobile terminal 100 in the first embodiment will be described with reference to FIG. 7. FIG. 7 shows a flow chart of the object information database registration process performed by the information identification server 10 and the mobile terminal 100. The tasks executed by the modules of each of the above-mentioned devices will be explained below together with the process.

First, the imaging module 190 images an object from a predetermined direction (step S40). The predetermined direction means the direction of the imaging point at which that the imaging module 190 images an object. The step S40 may be processed two or more times. Instead of the mobile terminal 100, other devices performing the processes to be described later may image an object.

Figure 13:
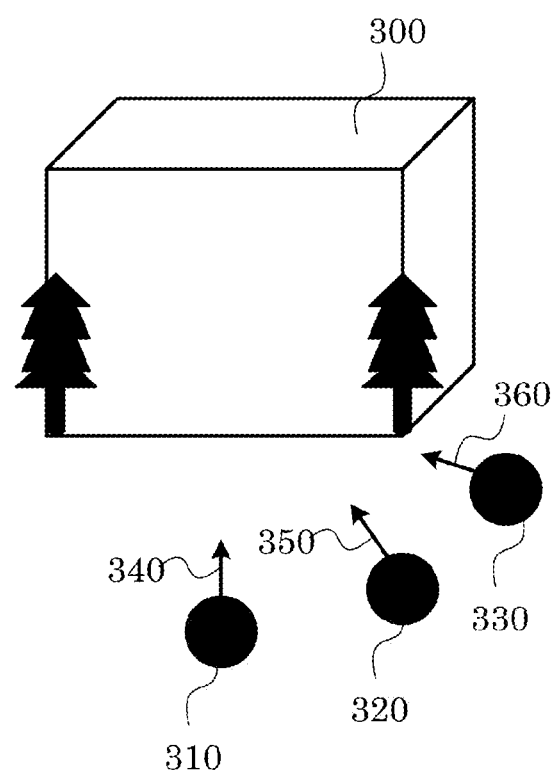
FIG. 13 schematically shows an object, imaging points, and imaging directions.

The predetermined direction and the different direction from which the imaging module 190 images an object is described below with reference to FIG. 13. FIG. 13 schematically shows an object, the imaging point, and the imaging directions. FIG. 13 shows that the imaging module 190 images the object 300 at a plurality of imaging points 310 to 330 from the directions of the respective arrows 340 to 360. The predetermined direction in this embodiment means taking an image at the imaging point 310 from the direction of the arrow 340. The different direction means taking an image at the imaging point 350 from the direction of the arrow 350 or the imaging point 360 from the direction of the arrow 360. The predetermined direction and the different direction may be of locations other than the imaging locations shown in this figure, which are not limited to the above-mentioned locations.

The location information acquisition module 180 acquires its own location information from a GPS 5 (step S41). In the step S41, the location information acquisition module 180 acquires the location information on the imaging point 310. The location information is an imaging point.

The direction information acquisition module 181 acquires direction information indicating a direction which the mobile terminal 100 faces by using the electronic compass (step S42). In the step S42, the direction information acquisition module 181 acquires the direction of the arrow 340 as direction information. The direction information is on the direction from the mobile terminal 100 to an object. The direction information acquisition module 181 may acquire direction information by a means other than the electronic compass.

The text input receiving module 182 receives an input of various texts such as the name and the attribute as text information on the imaged object (step S43).

The order of the steps S41 to S43 may be appropriately changed.

The object information transmitting module 160 transmits object information including image data, image information containing the identifier of this image data, the location information, the direction information, and the text information to the information identification server 10 (step S44).

The object information receiving module 20 receives the object information transmitted from the mobile terminal 100. The object information registration module 30 registers the image information, the location information, the direction information, and the text information in the object information database based on the received object information (step S45).

Object Information Database

The object information database will be described with reference to FIG. 14. FIG. 14 shows an object information database that the object information registration module 30 registers. In FIG. 14, the object information registration module 30 associates and stores image information, location information, direction information, and text information. The image information is an identifier of a taken image. This identifier is associated with an image data. The location information indicates a GPS coordinate expressing an imaging point. The direction information indicates a direction from an imaging point to an object. The text information is various types of information such as the name and the attribute of an object. The image data may be registered as image information as is. The location information may be registered in other expression forms. The direction information may be registered in other expression forms. The text information may be registered as other types of information other than a name. In addition to these types of information, other types of information may be registered.

In FIG. 14, the image information "Image A", the location information "X0, Y0," the direction information "Northwest," and the text information "Securities Company XX" are associated. Furthermore, the image information "Image B", the location information "X1, Y1," the direction information "North," and the text information "Securities Company XX" are associated. Still furthermore, the image information "Image C", the location information "X2, Y2," the direction information "West-northwest," and the text information "Tree of Securities Company XX" are associated. In this embodiment, the images A, B, and C are imaged from the imaging points 320, 310, and 330, respectively.

Information Identification Process in First Embodiment

Figure 8:
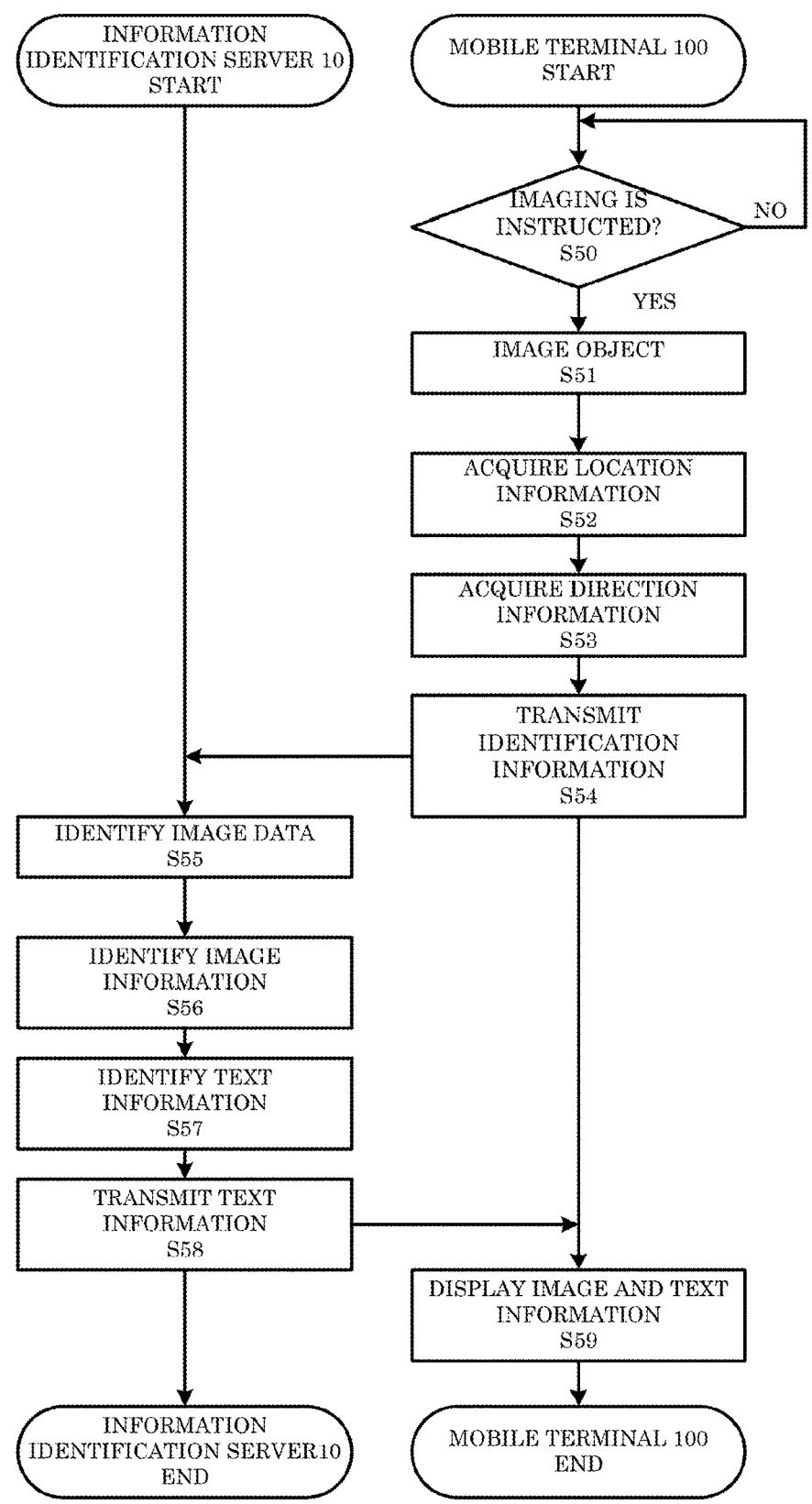
FIG. 8 shows a flow chart of the information identification process performed by the information identification server 10 and the mobile terminal 100 in the first embodiment.

The information identification process performed by the information identification server 10 and the mobile terminal 100 in the first embodiment will be described with reference to FIG. 8. FIG. 8 shows a flow chart of the information identification process performed by the information identification server 10 and the mobile terminal 100. The tasks executed by the modules of each of the above-mentioned devices will be explained below together with the process.

First, the imaging module 190 judges whether or not the imaging module 190 has received an instruction to image an object (step S50). In the step S50, if judging that the imaging module 190 has not received an instruction to image an object (NO), the imaging module 190 repeats the process until receiving an instruction to take an image.

If judging that the imaging module 190 has received an instruction to image an object (YES) in the step S50, the imaging module 190 images an object (step S51). In the step S51, the imaging module 190 images an object from a predetermined direction or a different direction.

The location information acquisition module 180 acquires the location information of the mobile terminal 100 in the same way as the process of the step S41 (step S52).

The direction information acquisition module 181 acquires the direction information of the mobile terminal 100 in the same way as the process of the step S42 (step S53).

The order of the steps S52 to S53 may be appropriately changed.

The identification information transmitting module 161 transmits identification information containing the image information, the location information, and the direction information to the information identification server 10 (step S54).

The identification information receiving module 21 receives the identification information. The object information identification module 31 compares the location information and the direction information contained in the received identification information with those registered in the object information database to identify image data associated with a plurality of pieces of image information as candidates (step S55). In the step S55, the object information identification module 31 collates the image information associated with the location information and the direction information that have been received this time to identify information on a plurality of images associated with the location information and the direction information as object candidates. Alternatively, the object information identification module 31 also identifies image information associated with the location information or the direction information, or the both which are approximate to the location information or the direction information, or the both which have received this time, respectively, as object candidates.

The object information identification module 31 recognizes the plurality of pieces of the identified image data to identify one piece of image data and then identifies image information associated to this image data (step S56). For example, the object information identification module 31 performs the process of recognizing the color, the shape, and the three-dimensional modeling as image recognition.

In the step S56, the object information identification module 31 recognizes the shapes of the plurality of pieces of the identified image data as object candidates. The object information identification module 31 recognizes the shape of the image data included in the image information that has received this time to recognize the shape of the object. The object information identification module 31 compares the identified shapes of the plurality of the object candidates with the shape of the received image data to identify the plurality of pieces of the identified image data with the matched shape and then to identify image information associated to this image data. The object information identification module 31 may identify image information based on a form other than the shape, such as the color and the three-dimensional modeling.

In the step S56, the object information identification module 31 also identifies an object, for example, with the largest area among the objects contained in one piece of image data as the object. The object information identification module 31 may identify all the objects contained in image data as the object. The object information identification module 31 may also identify an object contained in image data in other ways as the object.

The object information identification module 31 identifies text information associated and stored with the identified image information in the object information database (step S57).

The text information transmitting module 22 transmits the identified text information to the mobile terminal 100 (step S58).

The text information receiving module 162 receives the text information transmitted from the information identification server 10. The display module 183 displays the received text information and the taken image (step S59).

Figure 15:
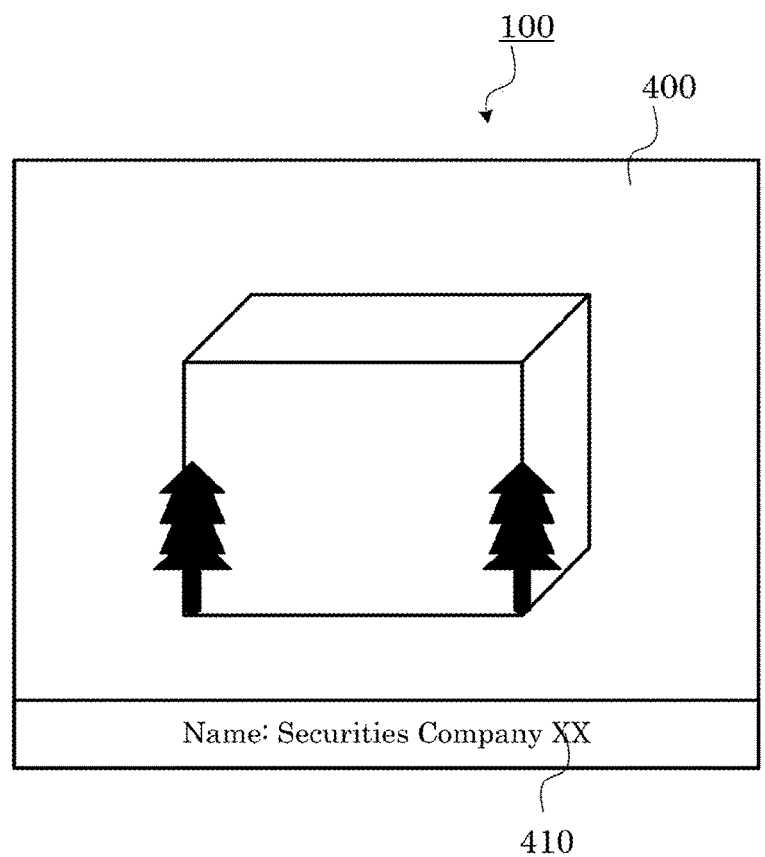
FIG. 15 shows text information and an image that the mobile terminal 100 displays.

FIG. 15 shows text information and a taken image that the display module 183 displays. In FIG. 15, the display module 183 displays an image display area 400 and a text information display area 410. The display module 183 displays the taken image in the image display area 400. The display module 183 displays the text information in the text information display area 410. The shape and the location of the text information display area 410 can be appropriately changed. For example, the text information display area 410 may be superimposed-displayed on an object or may be displayed in other locations in the image display area 400. The text information may be read aloud by voice notification as displayed in the text information display area 410. The identified text information and the image data may be transmitted to other devices.

The above-mentioned processes may be performed by either the mobile terminal 100 or the information identification server 10, or the both.

Three-Dimensional Identification Process in First Embodiment

Figure 9:
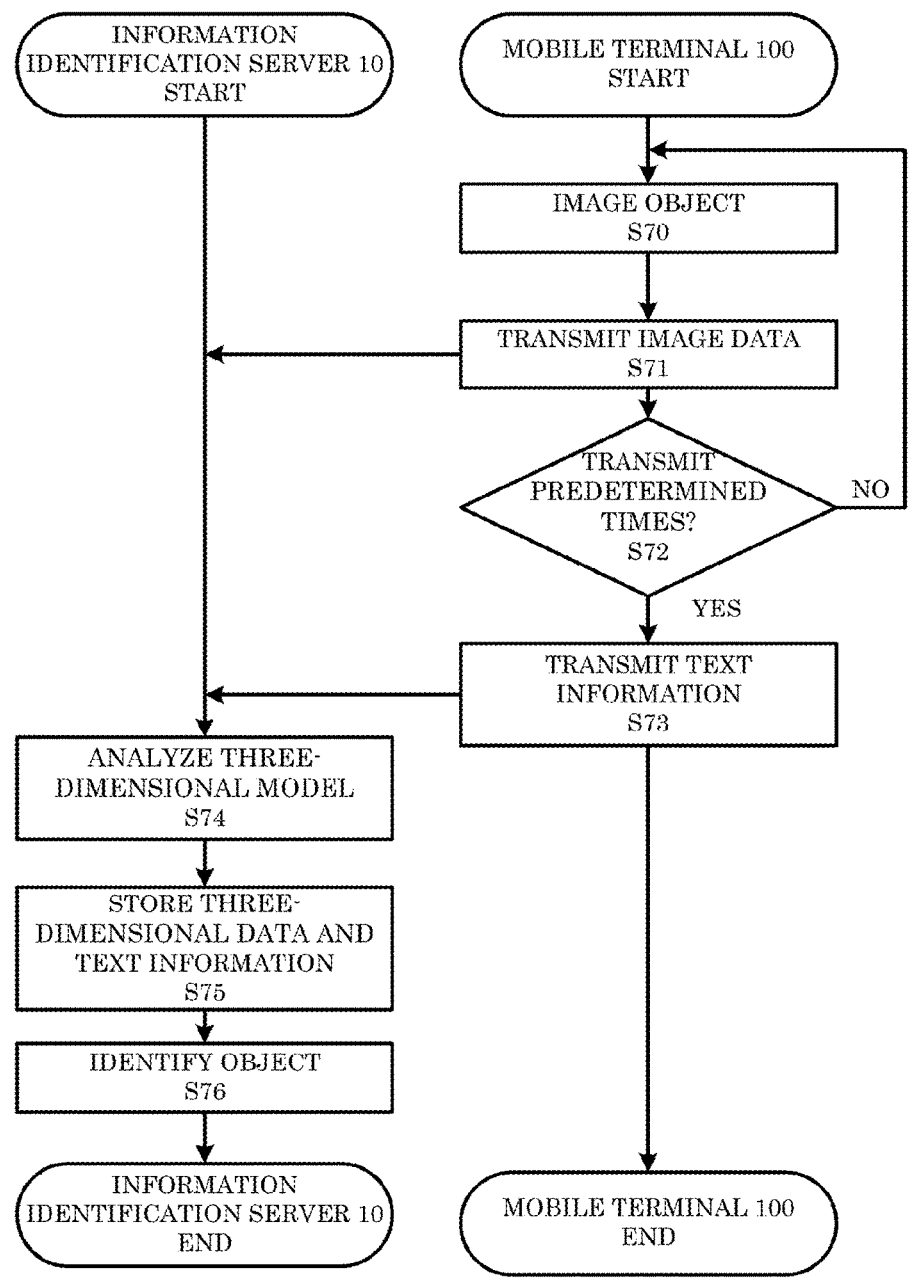
FIG. 9 shows a flow chart of the three-dimensional identification process performed by the information identification server 10 and the mobile terminal 100 in the first embodiment.

The three-dimensional information identification process performed by the information identification server 10 and the mobile terminal 100 in the first embodiment will be described with reference to FIG. 9. FIG. 9 shows a flow chart of the three-dimensional identification process performed by the information identification server 10 and the mobile terminal 100. The tasks executed by the modules of each of the above-mentioned devices will be explained below together with the process.

The imaging module 190 images one object from a predetermined direction (step S70). The step S70 is processed in the same way as the above-mentioned step S40.

The image data transmitting module 163 transmits image data of the imaged object to the information identification server 10 (step S71). In the step S71, for example, one tree of woods is focused and imaged.

The image data transmitting module 163 judges whether or not the image data transmitting module 163 has transmitted the image data predetermined times (step S72). The number of predetermined times are, for example, two or more. If the image data transmitting module 163 judges that the image data transmitting module 163 has not transmitted the image data predetermined times (NO) in the step S72, the process returns to the step S70.

If the image data transmitting module 163 judges that the image data transmitting module 163 has transmitted the image data predetermined times (YES) in the step S72, the text input receiving module 182 receives an input of text information on the object, and the object information transmitting module 160 transmits the text information to the information identification server 10 (step S73).

The image data receiving module 23 receives the image data and the text information that the mobile terminal 100 transmitted. The object information identification module 31 analyzes the three-dimensional models of data on the object that is contained in the image data (step S74). In the step S74, the object information identification module 31 analyzes the three-dimensional models of each of the plurality of pieces of the received image data.

The object information registration module 30 learns the analyzed three-dimensional models of one object based on the plurality of the analyzed three-dimensional models of the one object and associates and stores the three-dimensional data of the learned three-dimensional models with the text information (step S75).

The information identification server 10 identifies the object based on the three-dimensional data and the text information that are stored in the step S75 when the steps after the above-mentioned step S55 are performed (step S76). In the step S76, the information identification server 10 analyzes the image data taken from a different direction, compares the three-dimensional data stored in the step S75 with that of the analyzed three-dimensional models of the image data to identify the object. In the comparison of the three-dimensional data, for example, the shape after the image data is subjected to edge extraction is compared with the stored three-dimensional data. The three-dimensional data may be compared in other ways.

The above-mentioned processes may be performed by either the mobile terminal 100 or the information identification server 10, or the both.

System for Information Identification 1 According to Second Embodiment

Figure 2:
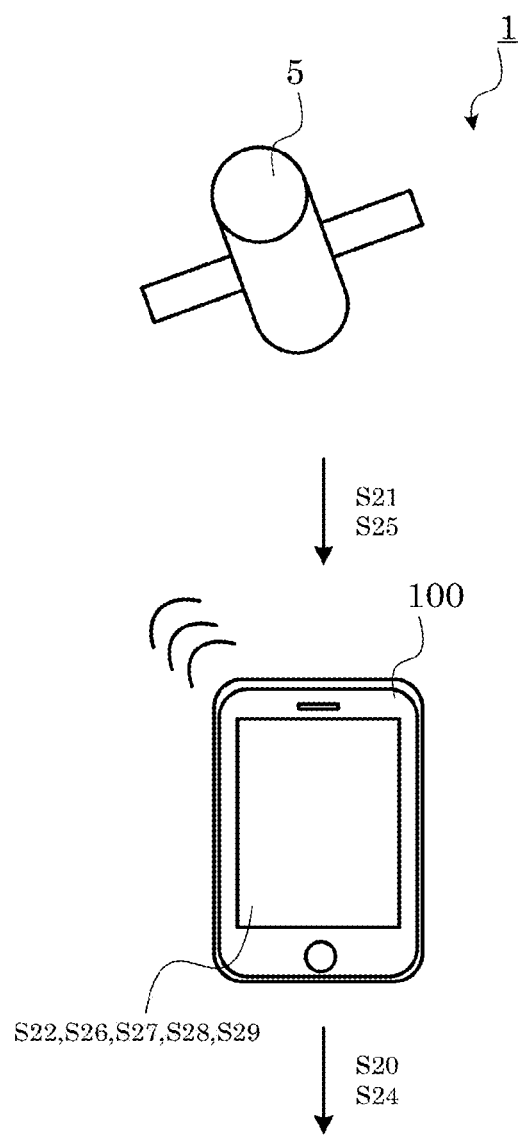
FIG. 2 shows a schematic diagram of the system for information identification 1 according to the second embodiment.

The second embodiment of the present invention will be described below with reference to FIG. 2. FIG. 2 shows an overview of the system for information identification 1 according to a preferable second embodiment of the present invention. The system for information identification 1 includes a mobile terminal 100 and a GPS 5. The reference signs in the second embodiment are assigned to the same components as those of the first embodiment. The detailed explanation of the same processes is omitted.

The mobile terminal 100 is a wearable terminal or an electrical appliance like the first embodiment. The mobile terminal 100 may be an uninhabited airborne vehicle like the first embodiment.

First, the mobile terminal 100 images an object from a predetermined direction (step S20). The step S20 is processed in the same way as the above-mentioned step S01.

The mobile terminal 100 acquires its own location information in the same way as the process of the above-mentioned step S02 (step S21)

The mobile terminal 100 acquires its own direction information in the same way as the process of the above-mentioned step S03 (step S22).

The order of the steps S21 to S22 may be appropriately changed.

The mobile terminal 100 stores object information including image information, the location information, the direction information, and the text information of the taken image (step S23).

Then, the mobile terminal 100 images an object from a predetermined direction or a different direction in the same way as the above-mentioned step S06 (step S24).

The mobile terminal 100 acquires its own location information in the same way as the process of the above-mentioned step S07 (step S25).

The mobile terminal 100 acquires its own direction information in the same way as the process of the step S08 (step S26).

The order of the steps S25 to S26 may be appropriately changed.

The mobile terminal 100 compares the location information and the direction information acquired in the steps S25 and S26, respectively, with those stored in the step S23 to identify the image information (step S27). In the step S27, the mobile terminal 100 collates the image information associated with the location information and the direction information that have been acquired this time to identify a plurality of pieces of image information associated with the location information and the direction information as object candidates. The mobile terminal 100 identifies image information associated with the location information and the direction information which are approximate to the location information and the direction information that have acquired this time, respectively, as object candidates. The information identification server 10 may identify image information to which the location information or the direction information is approximate as object candidates.

The mobile terminal 100 extracts the feature amount of image information on each of the plurality of the identified object candidates as a first feature amount and the feature amount of the image information taken this time as a second feature amount and then compares the first feature amounts with the second feature amount to identify one piece of image information (step S28). For example, the mobile terminal 100 extracts the feature amount based on the color, the shape, and the three-dimensional modeling as the feature amount of image information. The mobile terminal 100 collates and identifies image information based on whether or not the extracted first feature amounts are matched with the second feature amount.

The mobile terminal 100 acquires text information associated with the one piece of the identified image information and displays the acquired text information (step S29).

System Configuration of System for Information Identification 1 According to Second Embodiment The system configuration of the system for information identification 1 according to the second embodiment will be described with reference to FIG. 4. FIG. 4 shows the system configuration of the system for information identification 1 according to a preferable second embodiment of the present invention. The reference signs in the second embodiment are assigned to the same components as those of the first embodiment. The detailed explanation of the components is omitted.

The system for information identification 1 includes a mobile terminal 100 and a GPS 5. The mobile terminal 100 is the above-mentioned wearable terminal, electric appliance, and uninhabited airborne vehicle with the functions to be described later in the same way as the first embodiment. The GPS5 is like in the first embodiment.

Functions of Second Embodiment

Figure 6:
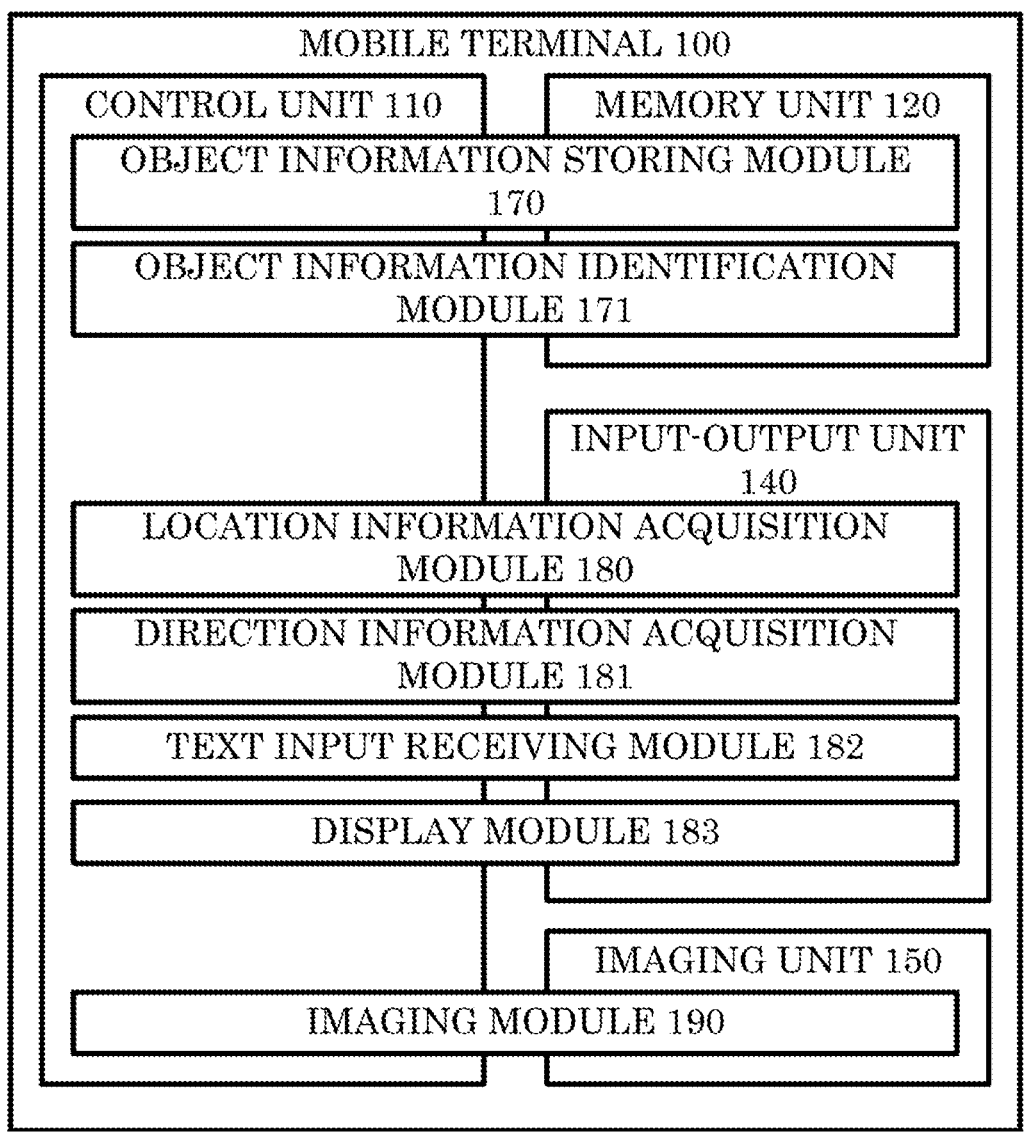
FIG. 6 shows a functional block diagram of the mobile terminal 100 in the second embodiment.

The structure of each device will be described below with reference to FIG. 6. FIG. 6 shows a functional block diagram of the mobile terminal 100 in a preferable second embodiment of the present invention.

The mobile terminal 100 includes the above-mentioned control unit 110, memory unit 130, input-output unit 140, and imaging unit 150.

Furthermore, in the mobile terminal 100, the control unit 110 reads a predetermined program to run an object information storing module 170 and an object information identification module 171 in cooperation with the memory unit 130. Furthermore, in the mobile terminal 100, the control unit 110 reads a predetermined program to run a location information acquisition module 180, a direction information acquisition module 181, a text input receiving module 182, and a display module 183 in cooperation with the input-output unit 140. Still furthermore, in the mobile terminal 100, the control unit 110 reads a predetermined program to run an imaging module 190 in cooperation with the imaging unit 150.

Information Registration Process in Second Embodiment

Figure 10:
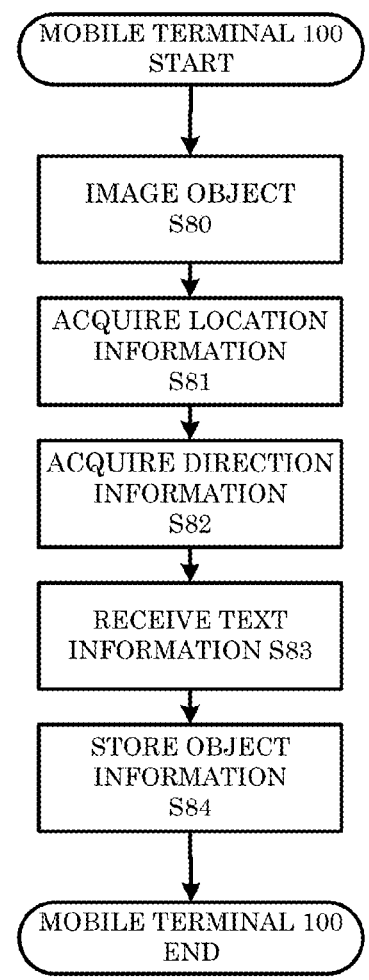
FIG. 10 shows a flow chart of the information registration process performed by the mobile terminal 100 in the second embodiment.

The information registration process performed by the mobile terminal 100 in the second embodiment will be described with reference to FIG. 10. FIG. 10 shows a flow chart of the information registration process performed by the mobile terminal 100. The tasks executed by the modules of each of the above-mentioned devices will be explained below together with the process. The detailed explanation of the components is omitted. The difference from the above-mentioned first embodiment is that the object information database exists in the first embodiment but not the second embodiment.

First, the imaging module 190 images an object from a predetermined direction (step S80). The step S80 is processed in the same way as the above-mentioned step S40. The predetermined direction and the different direction different are the same as those in the first embodiment. The detailed explanation of these directions is omitted.

The location information acquisition module 180 acquires its own location information from a GPS 5 (step S81). The step S81 is processed in the same way as the above-mentioned step S41.

The direction information acquisition module 181 acquires the direction information of the mobile terminal 100 (step S82). The step S82 is processed in the same way as the above-mentioned step S42.

The text input receiving module 182 receives an input of text information on the imaged object (step S83). The step S83 is processed in the same way as the above-mentioned step S43.

The order of the steps S81, S82, and S83 can be appropriately changed in the same way as the first embodiment.

The object information storing module 170 stores object information (step S84).

Information Identification Process in Second Embodiment

Figure 11:
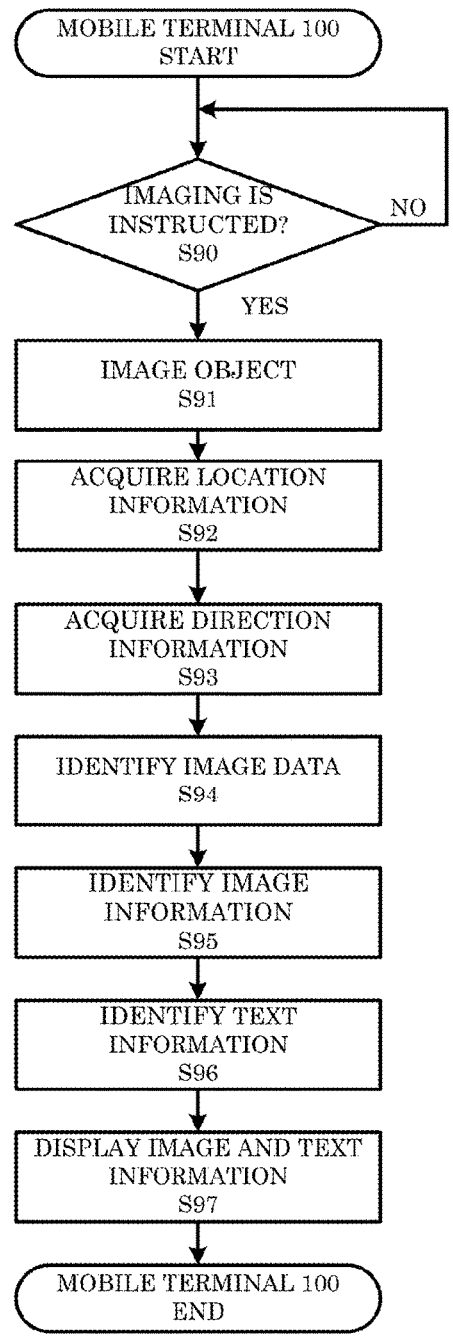
FIG. 11 shows a flow chart of the information identification process performed by the mobile terminal 100 in the second embodiment.

The information identification process performed by the mobile terminal 100 in the second embodiment will be described with reference to FIG. 11. FIG. 11 shows a flow chart of the information identification process performed by the mobile terminal 100. The tasks executed by the modules of the above-mentioned devices are explained below together with this process.

First, the imaging module 190 judges whether or not the imaging module 190 has received an instruction to image an object (step S90). In the step S90, if judging that the imaging module 190 has not received an instruction to image an object (NO), the imaging module 190 repeats the process until receiving an instruction to take an image.

If judging that the imaging module 190 has received an instruction to image an object (YES) in the step S90, the imaging module 190 images the object (step S91). In the step S91, the imaging module 190 images an object from a predetermined direction or a different direction.

The location information acquisition module 180 acquires the location information of the mobile terminal 100 in the same way as the process of the step S81 (step S92).

The direction information acquisition module 181 acquires the direction information of the mobile terminal 100 in the same way as the process of the step S82 (step S93).

The order of the steps S92 to S93 may be appropriately changed.

The object information identification module 171 compares the acquired location information and direction information with those stored to identify image data associated with a plurality of pieces of image information as candidates (step S94). The step S94 is processed in the same way as the above-mentioned step S55.

The object information identification module 171 recognizes the plurality of pieces of the identified image data to identify one piece of image data and then identifies image information associated to this image data (step S95). In the step S95, the object information identification module 171 extracts the feature amount of image information data on each of the plurality of the identified object candidates as a first feature amount. Examples of the first feature amount include the color, the shape, and the three-dimensional modeling. The object information identification module 171 also extracts the feature amount of image information data on the image taken this time as a second feature amount. Examples of the second feature amount include the color, the shape, and the three-dimensional modeling. The object information identification module 171 then compares the first feature amounts with the second feature amount to identify image information with the extracted first feature amount matched with the second feature amount to identify image information.

The object information identification module 171 identifies text information associated with the identified image information (step S96).

The display module 183 displays the identified text information and the taken image (step S97). The step S97 is processed in the same way as the above-mentioned step S59.

Three-Dimensional Identification Process in Second Embodiment

Figure 12:
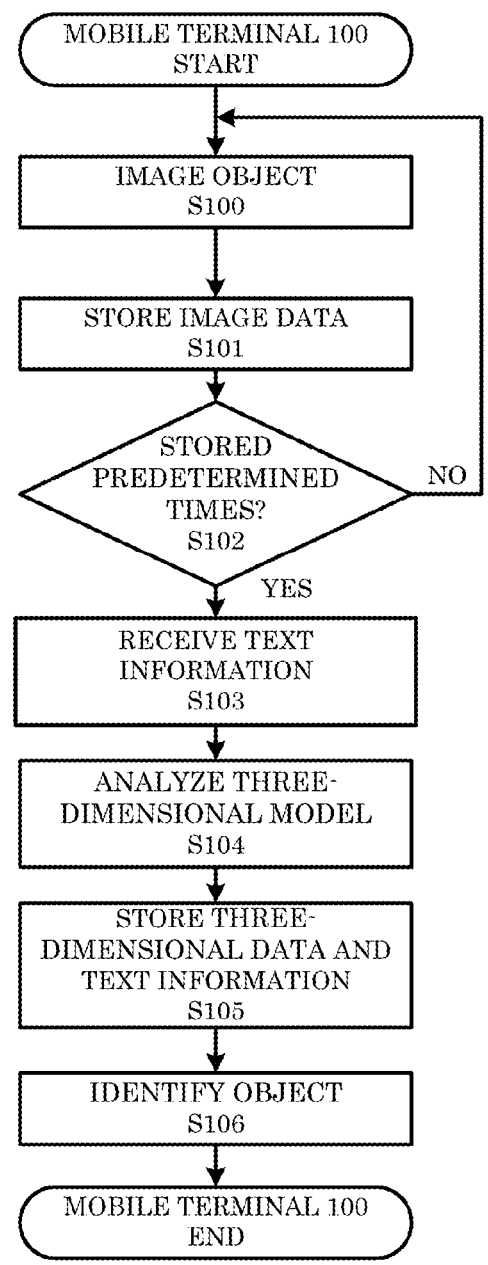
FIG. 12 shows a flow chart of the three-dimensional identification process performed by the mobile terminal 100 in the second embodiment.

The three-dimensional identification process performed by the mobile terminal 100 in the second embodiment will be described with reference to FIG. 12. FIG. 12 shows a flow chart of the three-dimensional identification process performed by the mobile terminal 100. The tasks executed by the modules of each of the above-mentioned devices will be explained below together with the process.

First, the imaging module 190 images one object from a predetermined direction (step S100). The step S100 is processed in the same way as the above-mentioned step S80.

The object information storing module 170 stores image information of the imaged object (step S101)

The object information storing module 170 judges whether or not the object information storing module 170 has stored the image data predetermined times (step S102). The number of predetermined times are, for example, two or more. If the object information storing module 170 has not stored the image data predetermined times (NO) in the step S102, the process returns to the step S100.

If the object information storing module 170 has stored the image data predetermined times (YES) in the step S102, the text input receiving module 182 receives an input of text information on the object (step S103).

The object information identification module 171 analyzes the three-dimensional models of data on the object that is contained in the image data (step S104). In the step S104, the object information identification module 171 analyzes the three-dimensional models of each of the plurality of pieces of the stored image data.

The object information storing module 170 learns the analyzed three-dimensional models of one object based on the plurality of the analyzed three-dimensional models of the one object and associates and stores the three-dimensional data of the learned three-dimensional models with the text information (step S105).

The mobile terminal 100 identifies the object based on the three-dimensional data and the text information that are stored in the step 106 when the steps after the above-mentioned step S95 are performed (step S106). The step S106 is processed in the same way as the above-mentioned step S76.

To achieve the means and the functions that are described above, a computer (including a CPU, an information processor, and various terminals) reads and executes a predetermined program. Programs are provided in the form recorded in a computer readable recording medium such as a flexible disk, CD (CD-ROM), or DVD (DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for information identification
10 Information identification server
100 Mobile terminal

What is claimed is:

1. A system for information identification, comprising:
   a database that registers information on an object in a memory unit;
   a first imaging unit that images, by a first imaging device, the object, at a plurality of imaging points, from a plurality of directions that are predetermined for the plurality of imaging points, respectively;
   a second imaging unit that images, by a second imaging device, the object from a certain direction at a certain imaging point;
   a registration unit that registers, by a processor, a plurality of pieces of information on the object imaged by the first imaging unit in the database, each of the plurality of pieces of information including location information of a corresponding one of the plurality of imaging points and direction information of a corresponding one of the plurality of directions;
   an identification unit that compares, by the processor, information on the object imaged by the second imaging unit with the plurality of pieces of information registered in the database to identify the object imaged by the second imaging unit, the information on the object imaged by the second imaging unit including location information of the certain imaging point and direction information of the certain direction.

2. The system according to claim 1, further comprising an analysis unit that analyzes, by the processor, images of the object imaged two or more times by the first imaging unit, wherein the registration unit registers analytical information on the object whose images have analyzed the database, and the identification unit compares information on the object imaged by the second imaging unit with analytical information registered in the database to identify the object, wherein each of the plurality of pieces of information further includes image information of an image of the object imaged, at a corresponding one of the plurality of imaging points, from a corresponding one of the plurality of directions and text information of the image, and wherein the identification unit identifies the object by identifying image information of the object imaged by the second imaging unit, and acquires the text information corresponding to the identified image information from the database; and
   a display unit that displays the image and the text information of the image.

3. A method for information identification, the method being executed by a system for information identification, comprising:
   a step of registering information on an object in a memory unit;
   a first step of imaging, by a first imaging device, the object, at a plurality of imaging points, from a plurality of directions that are predetermined for the plurality of imaging points, respectively;
   a second step of imaging, by a second imaging device, the object from a certain direction at a certain imaging point;
   a step of registering, by a processor, a plurality of pieces of information on the object imaged in the first step in the database, each of the plurality of pieces of information including location information of a corresponding one of the plurality of imaging points and direction information of a corresponding one of the plurality of directions;
   a step of comparing, by the processor, information on the object imaged in the second step with the plurality of pieces of information registered in the database to identify the object imaged in the second step, the information on the object imaged in the second step including location information of the certain imaging point and direction information of the certain direction, wherein each of the plurality of pieces of information further includes image information of an image of the object imaged, at a corresponding one of the plurality of imaging points, from a corresponding one of the plurality of directions and text information of the image, and
   wherein the step of comparing includes identifying the object by identifying image information of the object imaged in the second step, and acquiring the text information corresponding to the identified image information from the database; and
   a step of displaying the image and the text information of the image.

* * * * *